Oct. 2, 1923.
F. VETTER
1,469,742
MOTOR CYCLE SADDLE OR SEAT
Filed Aug. 15, 1921
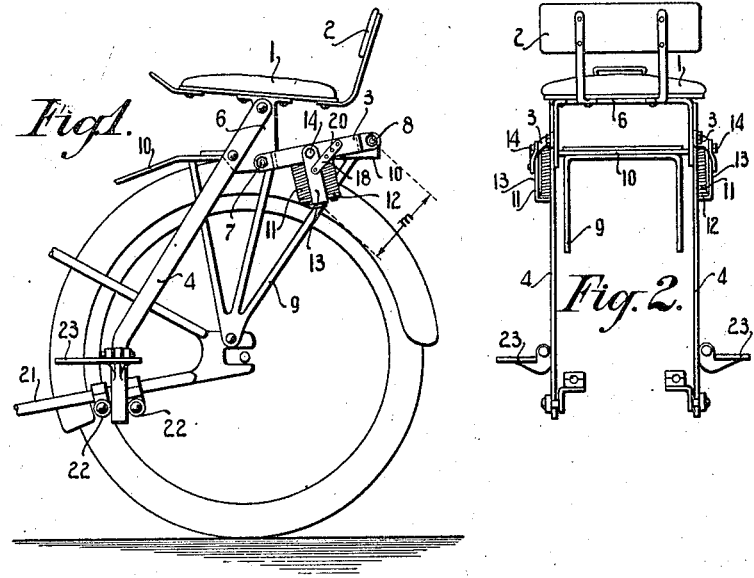
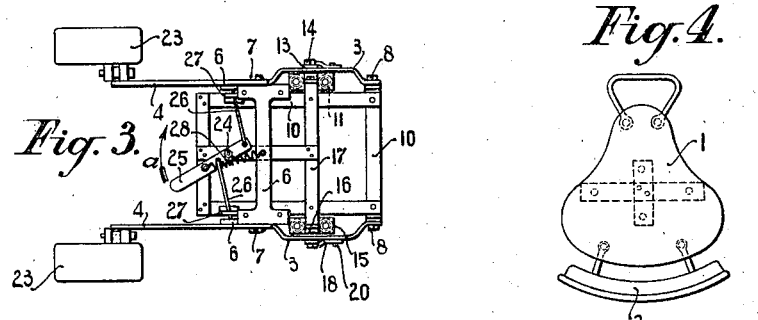
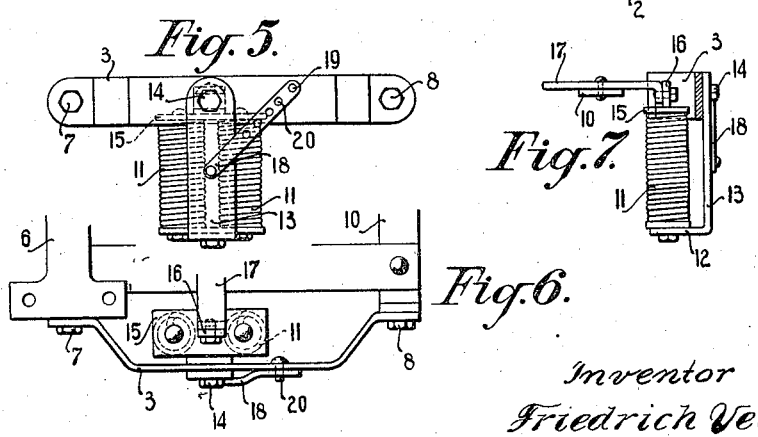
Inventor
Friedrich Vetter
By Hood & Schley
Attorneys Patented Oct. 2, 1923.

1,469,742

UNITED STATES PATENT OFFICE.

FRIEDRICH VETTER, OF AMSTERDAM, NETHERLANDS.

MOTOR-CYCLE SADDLE OR SEAT.

Application filed August 15, 1921. Serial No. 492,238.

*To all whom it may concern:*

Be it known that I, FRIEDRICH VETTER, a subject of the Queen of the Netherlands, residing at Amsterdam, Netherlands, have invented certain new and useful Improvements in and Relating to Motor-Cycle Saddles or Seats, of which the following is a specification.

My present invention relates to motor cycle saddles or seats, more particularly to rear seats for motor cycles.

When using known saddles and rear seats heavy shock and jar is transmitted to the rider especially when the seat is provided with a back support. This inconvenience is avoided by my present invention which is characterized by the feature that the seat bottom and the foot rests, which together form a resiliently suspended rigid system, are so guided that the seat bottom, when being depressed with respect to the cycle frame, moves rearwardly along an inclined path, whereas the foot rests move in a direction more towards the vertical or even forwardly. The said rigid system may, for instance, be guided with its upper portion by a forwardly and downwardly projecting coupling rod, or by a set of such rods, and with its lower portion by means permitting of said system to move in a direction more towards the vertical.

Experiments have demonstrated that a system thus suspended affords remarkable comfort. This should be attributed to the fact that the seat bottom and the foot rests move approximately about an axis coincident with or located at a slight distance from the front axle of the cycle. It may further be assumed that the back wheel, the movements of which substantially determine those of the cyclist and still more those of the back rider, moves about the fore axle when the cycle encounters an obstacle on or a rut in the roadway. Owing to the action of the mass of motor and cycle and to the resiliency of the front fork the rear wheel, when moving up or down on the roadway, will oscillate about an axis somewhere between the cyclist and the front axle.

The supports for the back rider should preferably be so guided relative to the cycle that neither the back support, nor the seat bottom, nor the foot rests are subject to appreciable accelerations besides those caused by the increased or reduced tension of the spring or springs.

When the desired effect is approximated by a construction wherein the seat bottom is guided by a downwardly and forwardly projecting coupling rod or lever pivoted on a fixed pin near the rear end of the cycle, and wherein the foot rests are guided by ordinary eyes through which the bars connecting seat bottom and foot rests are adapted to move up and down so as to have some freedom to change their direction, it is obvious that said coupling rod must in its central or normal position have a predetermined incline in order that the maximum effect may be realized. If now the buffer were invariable in its action, the central position of said coupling rod would be dependent upon the weight of the back rider, the consequence being that not so good an effect would be attained as when the coupling rod in its central position had the most favorable incline. In this simple mechanism, therefore, the strength or the action of the buffer is made adjustable responsive to the load so that the mechanism may assume its central position when under stationary load. In this manner a relative motion is obtained which most satisfactorily approximates ideal conditions. This is quite sufficient as owing to the irregular movements of the cycle over the roadway no invariable and exactly determinable centre of the relative movement can exist.

It will be readily understood that for realizing the desired effect I am not limited to the employment of coupling rods which are pivoted at both ends. I could also use straight or curved guide ways, although these may not be as suitable as the means referred to above.

The annexed drawing illustrates, by way of example only, an embodiment of my invention.

Fig. 1 is a side elevation of the rear part of a motor cycle equipped with my improved rear-seat mounting.

Fig. 2 is a rear elevation of the rear seat.

Fig. 3 is a plan view with the seat bottom removed.

Fig. 4 is a plan view of the seat bottom.

Figs. 5, 6 and 7 are a side elevation, a plan view and a front elevation respectively of the resilient suspension.

The seat bottom 1 and the back support 2 are connected with a plate 6 bent twice at right angles to form a kind of U, and with two rods 4 each carrying a foot rest 23, so as to form a rigid unit. At either side of the seat bottom 1 are provided levers or coupling rods 3, pivoted as at 7 to the plate 6.

The levers 3 are pivoted as at 8 to a frame or luggage carrier 10 secured to the cycle frame through stays 9. Said levers project forwardly and downwardly relative to said pivots 8. Moreover, said levers are resiliently coupled with this carrier through springs 11, which as shown are tension springs, the lower ends of which are pivotally connected as at 14 to the levers 3 by means of a strap 13 which carries the lower end of said springs and has an off-set portion 12, the upper ends thereof being interconnected by braces 15. Each brace has formed thereon a lug 16 attached to a cross bar 17 of carrier 10. By these means I may swing the springs 11 about the pivots 14 so as to adjust their moment with respect to the fulcrum 8. When the springs are suitably adjusted they may be locked by means of a link 18 pivoted to strap 13 and provided with a series of holes adapted to receive a pin 20 on lever 3. Affixed to the cycle frame 21 are rollers 22 between which are guided the off-set lower end portions of the rods 4. The foot rests 23 are hinged to said rods 4 in such a manner that they may be collapsed when not in use.

In order that the rear seat may be immobile when not in use, a double armed lever 25 is pivoted as at 24 to the luggage carrier 10. Pins 26 pivoted to said lever 25 pass through eyes 27 on the carrier 10 and, when the device assumes the position shown in full lines in Fig. 3, also through holes in plate 6. When lever 25 is swung through a certain angular distance in the direction of arrow $a$, the pins 26 are retracted from said holes whereby the seat is released. A spring 28 serves to lock lever 25 in its extreme positions.

When the seat 1 is loaded, the levers 3 turn about fulcrums 8 and the springs 11 will be tensioned. The rods 4, guided by the rollers 22, permit of the backward depression of the seat bottom, at the same time permitting the seat bottom and back support 2 to cant. Owing to the backward motion of the seat bottom 1 during its oscillation about fulcrum 8 the inconvenient jars of the back support are avoided.

By adjusting the springs 11 so as to reduce the length of the moment arm I obtain a lighter springing action, and viceversa, so that the springs may always be set to accommodate themselves to the weight of the back rider.

What I claim is:

1. In a motor cycle, the combination with the motor cycle frame, of a seat carried by said frame and movable relatively thereto, foot rests rigid with said seat so that they move when the seat moves, and guiding means for guiding said seat along a line extending rearwardly and downwardly relative to said motor cycle frame and for guiding said foot rests in a path which moves the foot rests forwardly with respect to the seat when the seat and foot rests are depressed with respect to the motor cycle frame, and a spring opposing said rearward and downward movement of said seat.

2. The combination set forth in claim 1, wherein said guiding means includes a lever which when in a normal intermediate position projects forward and downward from a fixed fulcrum on the motor cycle frame to a point of pivotal attachment on the upper part of the interconnected rigid seat-and-foot-rest system, and also includes vertical guiding members in which the lower part of said seat-and-foot-rest system is guided in a substantially vertical direction.

3. In combination with a motor-cycle frame, a unitary seat frame movably mounted on said cycle frame, a seat carried by the upper part and foot rests carried by the lower part of said seat frame, said mounting for the seat frame including guiding means which when the seat frame is depressed on the cycle frame moves the upper part of said seat frame toward the rear relatively to its lower part and also moves said upper part both downward and rearward relatively to the cycle frame, and a buffer spring opposing the depression of said seat frame.

4. In combination with a motor-cycle frame, a unitary seat frame movably mounted on said cycle frame, a seat carried by the upper part and foot rests carried by the lower part of said seat frame, said mounting for the seat frame including guiding means which when the seat frame is depressed on the cycle frame moves the upper part of said seat frame toward the rear relatively to its lower part, and a buffer spring opposing the depression of said seat frame.

5. In combination with a motor-cycle frame, a unitary seat frame movably mounted on said cycle frame, a seat carried by the upper part and foot rests carried by the lower part of said seat frame, said mounting for the seat frame including guiding means which when the seat frame is depressed on the cycle frame moves the upper part of said seat frame both downward and rearward relatively to the cycle frame, and a buffer spring opposing the depression of said seat frame.

6. In combination with a motor-cycle frame, a unitary seat frame, a seat carried by the upper part and foot rests carried by the lower part of said seat frame, guides on the cycle frame in which guides the lower part of the seat frame is vertically slidable, a lever pivoted to the upper part of the seat frame and to the cycle frame and when in an intermediate position extending downward and forward from its point of pivotal attachment to the cycle frame to its point of pivotal attachment to the seat frame, and a spring acting between said lever and the cycle frame.

7. In combination with a motor-cycle frame, a unitary seat frame, a seat carried by the upper part and foot rests carried by the lower part of said seat frame, guides on the cycle frame in which guides the lower part of the seat frame is vertically slidable, a lever pivoted to the upper part of the seat frame and to the cycle frame and when in an intermediate position extending downward and forward from its point of pivotal attachment to the cycle frame to its point of pivotal attachment to the seat frame, and a spring acting between said lever and the cycle frame, said spring being adjustable with relation to said lever to vary the turning moment with which it acts thereon.

8. The combination set forth in claim 2, wherein said spring is adjustable to set said lever in a predetermined normal intermediate position for varying stationary loads on such seat.

9. The combination set forth in claim 2, wherein said spring acts between said lever and a fixed point of the motor cycle frame but is adjustable to different angles with respect to said lever to vary the effect of the spring.

In testimony whereof I affix my signature.

FRIEDRICH VETTER.